June 29, 1965  A. E. NEWTON ETAL  3,191,865
APPARATUS FOR SPRAYING HEAT-REACTIVE MATERIAL
Filed Oct. 12, 1962  6 Sheets-Sheet 3

United States Patent Office 3,191,865
Patented June 29, 1965

---

3,191,865
APPARATUS FOR SPRAYING HEAT-REACTIVE MATERIAL
Albert E. Newton, Beverly, and Warren A. Cavicchi, Ipswich, Mass., assignors to United Shoe Machinery Corporation, Flemington, N.J., and Boston, Mass., a corporation of New Jersey
Filed Oct. 12, 1962, Ser. No. 230,143
7 Claims. (Cl. 239—85)

This invention relates to apparatus for applying heat-reactive materials to surfaces and is illustrated herein as embodied in apparatus for spraying surfaces with heat-reactive bonding material, such as thermoplastic or thermosetting adhesives, or compositions of thermoplastic and thermosetting adhesives.

As is well known, such adhesives are normally in a dry, non-tacky state and are rendered tacky by being subjected to heat. When applied to a cool surface, the heat of the molten adhesive is rapidly dissipated and the adhesive sets almost instantly. By reason of this characteristic property, these adhesives are extremely useful for performing rapid bonding operations. In using a heat-reactive adhesive for bonding work pieces together, in accordance with the method most commonly practiced, the adhesive is heated to reduce it to liquid, molten state and applied to one or both surfaces to be assembled in the form of a ribbon or band by applicators provided with rolls or extrusion nozzles. This method presents several disadvantages. To insure a continuously available supply of molten adhesive ready for use, it must be maintained heated at a fairly elevated temperature, and after prolonged heating the adhesive begins to deteriorate. When the heat is shut off the adhesive left in the nozzle hardens, and before the applicator can be used again the adhesive must be reheated, with resultant loss of time. Further, to produce effective wetting and all-over contact of the adhesive with the surfaces to be assembled and to insure that the deposited adhesive will have sufficient heat to maintain it in tacky condition until the surfaces have been pressed together, in view of the rapidity with which the adhesive cools and sets, it is necessary to apply the adhesive in relatively thick bands, considerably in excess of the quantity actually required for an effective bond, which makes the use of the adhesive quite costly.

Experiments have proved that substantial savings and improved bonding results may be obtained, while avoiding the disadvantages cited above, by use of a heat-reactive adhesive in the form of a powder which may be sprayed on the surface of a work piece to which another work piece is to be joined. To insure that the powder particles will adhere to the surface on which they are sprayed without risk of being blown off, it is advantageous to render them tacky before they reach the target surface. This is conveniently accomplished by causing the particles to pass through a stream of heated gas (for example, air). It has been observed that utmost efficiency of operation and best results are obtained if the particles are heated after leaving the spray nozzle, thereby insuring against clogging of the nozzle by accumulation of material.

An apparatus for spraying powdered thermo-reactive material in the manner explained above is described in an application Serial No. 86,144, filed January 31, 1961, in the name of Albert E. Newton, one of the present applicants, entitled "Method of and Apparatus for Applying Coatings to Surfaces." The apparatus disclosed in the said application comprises a hand-held spray gun including a barrel containing electrical heating elements and through which air is caused to pass to heat and partially activate powdered adhesive projected from a tube adjacent to the gun barrel.

Spraying of powdered thermo-reactive adhesive presents certain problems which must be solved satisfactorily to insure efficient operation. One such problem concerns the feeding of powder from the container into the tube through which it is carried into the stream of hot air. It has been observed that the gravity flow of the powder from the container to the tube tends to vary with the density, volume, and moisture content of the material, resulting in the discharge of uneven quantities of the material.

Another factor in the efficient operation of the spraying apparatus concerns the control of the temperature of the air which carries the powder through the tube into the hot air stream, so as to insure that the powder in the tube will not be heated and clog the tube, while at the same time guarding against the possibility that the air flowing through the powder tube might lower the temperature of the hot air flowing from the heating tube to a degree which would reduce the efficient heating action of the hot air stream on the particles projecting through it.

Still another important requirement in the efficient spraying of heat-reactive powder material is to insure that all the particles projected through the hot air stream are heated uniformly without loss of material through dissipation in the surrounding atmosphere.

It is an object of the present invention to provide an improved spraying apparatus of the type previously referred to, by use of which heat reactive powdered material, for example, thermoplastic resinous adhesive, may be sprayed on a surface in a more efficient manner than has been possible heretofore.

To this end there is provided an apparatus having improved means for controlling the flow of powdered material from the container to be conducted through the carrying tube into the stream of heated air; means to maintain the powder carrying tube cool to prevent agglomeration of the powdered material therein; and improved means for heating the material discharged from the tube so as to render it partially tacky as it travels toward the surface to be coated and completely tacky after being deposited upon the surface.

As herein illustrated, the apparatus comprises a hand-held spray gun on which is mounted a container for a supply of powdered material, the container being tightly closed at its upper end and open at its lower end. To the open end of the container is attached a cup or chamber from which powdered material is conducted through a tube connected to the cup into a stream of heated air. Extending through the open end of the container substantially to the top thereof is an air tube which is connected through a valve to the outlet end of a cooling device or heat exchanger, the inlet end of which is connected to an air compressor. The gun handle is provided with a trigger which, when pressed, closes a microswitch to actuate a vibrating device to vibrate the cup and cause powder to be sifted into the tube through which the powder is conducted into the hot air stream, and at the same time opens the valve to admit air into the space above the mass of powdered material in the container through the tube disposed therein, whereby the powder is put under pressure to force it downward. The air then passes down a second air tube mounted in the container to propel the powder from the cup or chamber through the previously mentioned tube connected to the cup.

The apparatus is further provided with an improved heating device for heating the particles of powdered adhesive issuing from the powder carrying tube so as to reduce them to a partially tacky or adherent condition before they reach the surface to be coated, and for additionally heating the particles deposited on the surface so as to fuse them completely. As herein illustrated, the heating device comprises a plurality of spaced tubes each carrying an electrical heating element, the tubes being angularly disposed, with their outlet ends converging in cone formation to produce a concentrated heat zone in front of the discharge end of the powder carrying tube. In accordance with a further feature of the invention, each of the heating tubes is connected to an air manifold to which air is carried through a tube connected at one end to the cooling device and at its other end to a passageway surrounding another passageway which, in turn, surrounds the powder carrying tube. The air from the cooling device is thus circulated through the inner passageway which surrounds the powder tube to maintain this tube cool and from that passageway to the outer passageway which is adjacent to the heater tubes, and the air is accordingly warmed before it enters the manifold to be supplied to the heater tubes. By this arrangement the air passing through these tubes may be heated to an adequate temperature to produce fusion of the powder particles without requiring heating elements of abnormally high wattage. A needle valve associated with each heater tube permits adjustment of the rate of flow of air through the individual tubes to insure uniform delivery of hot air from all the tubes.

These and other features and advantages of the invention will be explained in detail in the following description, with reference to the accompanying drawings, and more particularly pointed out in the claims.

Figure 1:
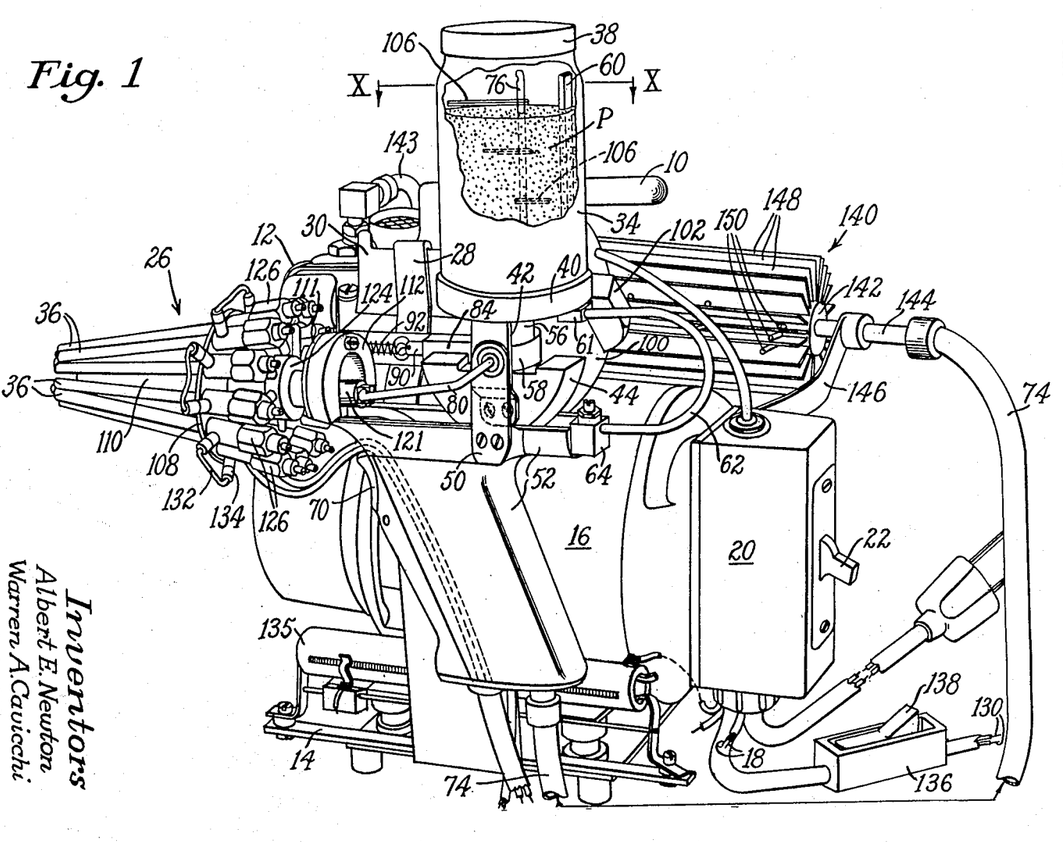
FIG. 1 is a perspective view of a spraying apparatus embodying the invention.

As may be seen in FIG. 1, the spraying apparatus provided by the present invention is a completely portable unit and is provided with a handle 10 by which it may be carried to any desired location and connected to a suitable electric outlet. It comprises an air compressor 12 supported by rubber mountings on a base 14 and driven by an electric motor 16 to which current is supplied through leads 18 from a switch box 20 provided with a main switch 22.

Figures 2, 3:
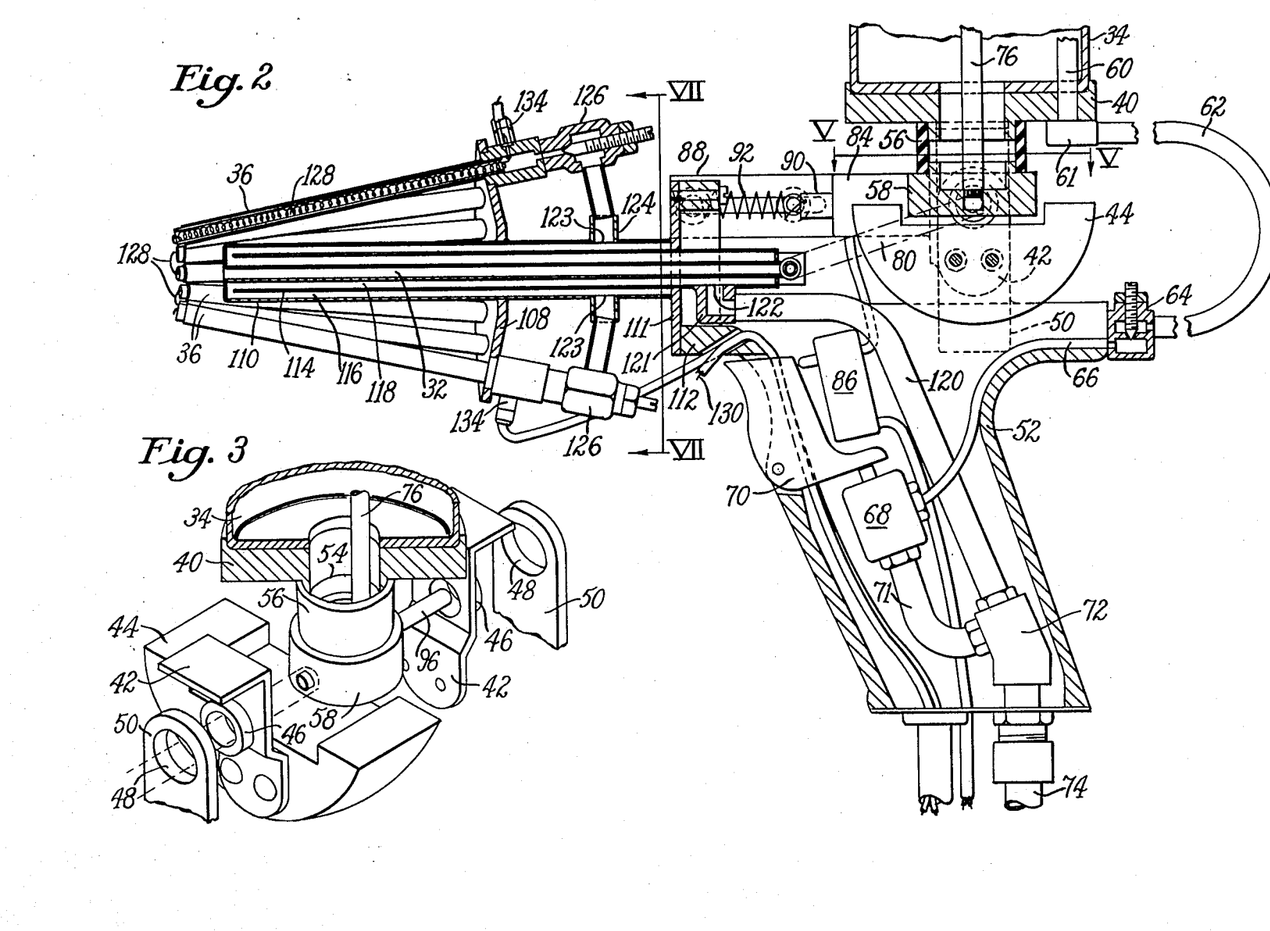
FIG. 2 is a view in side elevation and partly in section of a spray gun which constitutes a part of the apparatus shown in FIG. 1.
FIG. 3 is an exploded perspective view illustrating the mounting of a container from which powdered material is supplied to the spray gun.
Figure 4:
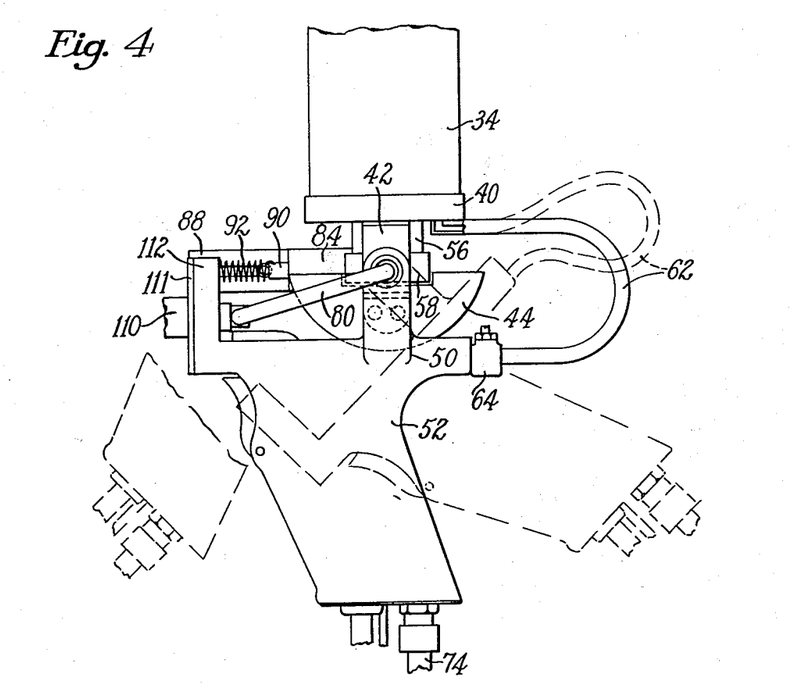
FIG. 4 is a view on a smaller scale than FIG. 2 of the right-hand portion of the spray gun, illustrating the manner in which the powdered material container maintains its upright position when the gun is tilted in different directions.

The apparatus further comprises a hand-held gun, identified generally by the reference numeral 26 and provided with a hook 28 by which it may be suspended, when not in use, on a bracket 30 secured to the base 14. The gun 26 comprises a tube 32 (FIG. 2) constituting a conduit through which powdered material P (FIG. 1), such as thermoreactive adhesive, supplied from a container 34, is projected onto a surface to be coated through a stream of heated air flowing through a plurality of electrically heated tubes 36. The container 34 is sealed at its upper end by a cap 38. Its lower, open end is supported on a ring or cap 40 from which depend a pair of arms 42 (FIG. 3) secured to a counterweight 44. Each arm 42 is formed with a collar or bushing 46 adapted to engage in a bearing 48 provided in each of a pair of arms 50 projecting upwardly from a hand grip 52 of the gun (FIGS. 1 and 2). This arrangement permits the container 34 to maintain its normal upright position irrespective of the angle at which the gun may be tilted, to insure uniform flow of the powdered material. The ring 40 is formed with a downwardly projecting lip 54 (FIG. 3) to which is secured a rubber tube 56 extending into a cup 58 defining a chamber.

Figure 10:
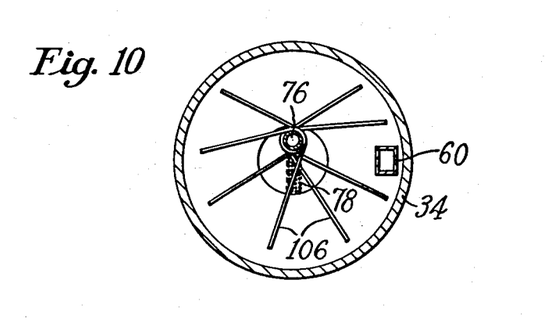
FIG. 10 is a sectional plan view of the powdered material container taken along the line X—X of FIG. 1.

As earlier explained, the feeding of powdered material from the container through the gun barrel or tube has presented certain difficulties in the use of spraying apparatus constructed heretofore. In particular, a pressure differential has sometimes been observed to exist between the top of the container and the cup, resulting in heavier flow of the material than desired, or inadequate flow or, in some instances, no flow at all. To remedy this condition and insure uniform flow of the material from the container into the cup, the following arrangement has been provided:

Referring more particularly to FIGS. 1 and 2, a tube 60 which, as shown in FIG. 10, is rectangular in cross section, extends from the ring 40 upwardly into the container 34, to near the top thereof. At its lower end the tube 60 is connected, through a fitting 61, a tube 62, a needle valve 64, and a tube 66, to a valve 68 housed in the interior of the hand grip 52 and under the control of a trigger 70 on the hand grip. The valve 68 is connected through a tube 71 and a coupling 72 to a hose 74 through which air is constantly supplied while the compressor 12 is in operation. Also disposed within the container 34 is a second tube 76 (FIGS. 1, 2, 5, 6 and 10), the upper end of which is open and the lower end of which is L-shaped and is secured to the bottom of the cup or chamber 58. The upper member 78 of the horizontal portion of the L is formed with a plurality of holes of suitable diameter to allow powder particles of a selected mesh size to be sifted into the bottom of the tube 76 when the tube is vibrated in unison with the cup 58, in response to pressure of the trigger 70, by means to be described.

The arrangement is such that, when the operator presses the trigger to initiate a spraying operation, the valve 68 (FIG. 2) is opened and air supplied to it through the tube 71 is conducted through the tube 66, the valve 64, the tube 62 and the tube 60 into the container 34 under a pressure determined by adjustment of the needle valve 64. In the herein illustrated apparatus the output air pressure of the compressor is approximately 25 p.s.i., the compressor being provided with a relief valve which is automatically opened when the air pressure exceeds the stated value. The needle valve 64 is preferably set to reduce the pressure of the air admitted into the container to approximately 5 p.s.i. The space above the powder mass in the container is thereby pressurized, thus eliminating or minimizing the pressure differential mentioned earlier as occurring between the upper part of the container and the cup 58 and as being the cause of uneven flow of the material. The air then flows downward through the tube 76 to propel the powder particles through a tube 80 connecting the tube 76 with the tube 32 and out the delivery end of this tube into the stream of heated air constantly flowing out of the electrically heated tubes 36 by which the particles are rendered partially tacky or adherent before they reach the target surface and thereafter completely melted.

Figure 5:
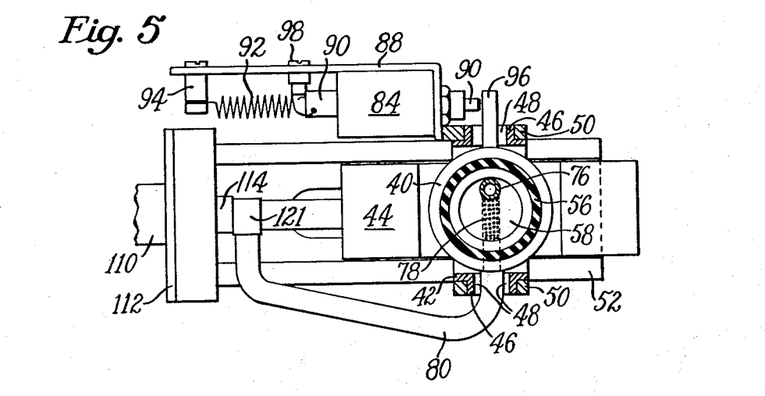
FIG. 5 is a sectional plan view along the line V—V of FIG. 2 of the mounting of the powder container and of an electromagnetic vibrator to cause powdered material to be sifted from the container when it is desired to perform a spraying operation.
Figure 6:
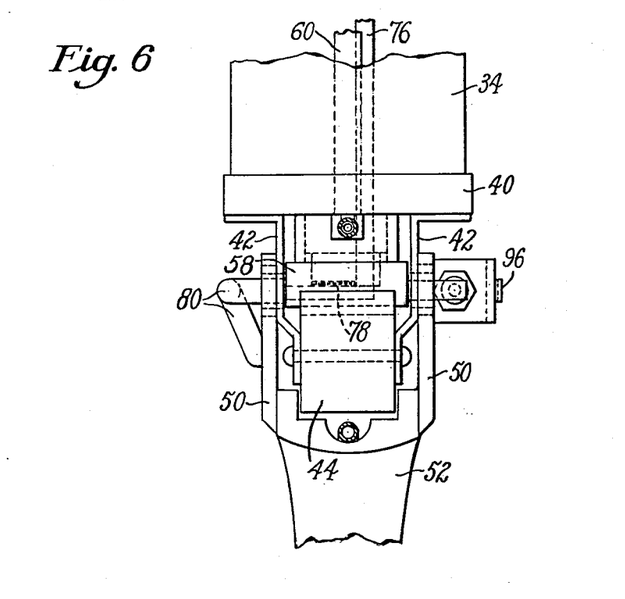
FIG. 6 is a view in end elevation of the mounting of the container.
Figure 7:
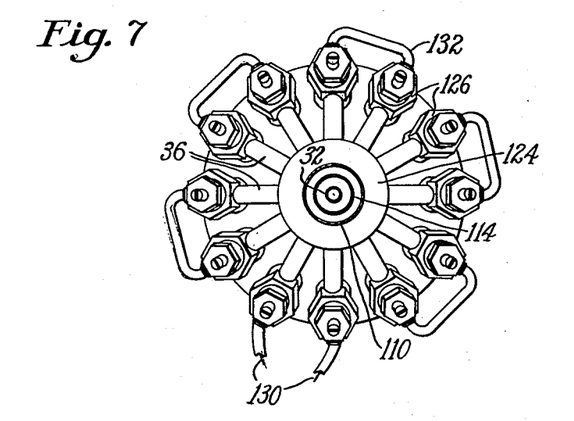
FIG. 7 is a sectional view along the line VII—VII of FIG. 2 illustrating an air manifold from which air is distributed to a plurality of electrical heating tubes.
Figure 11:
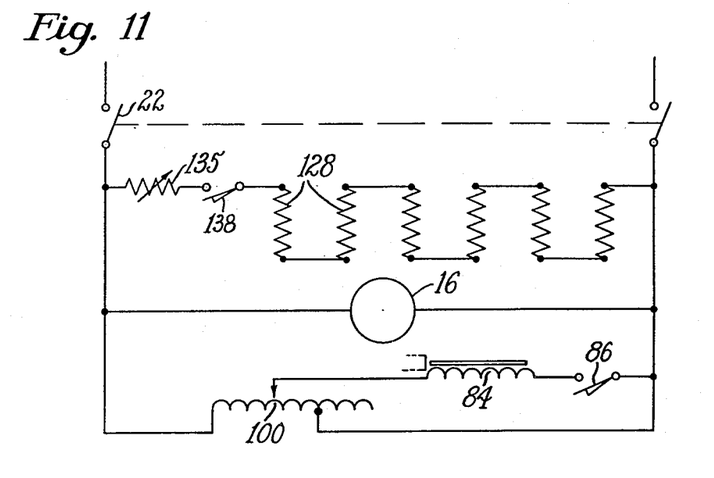
FIG. 11 is an electrical wiring diagram.
Figure 12:
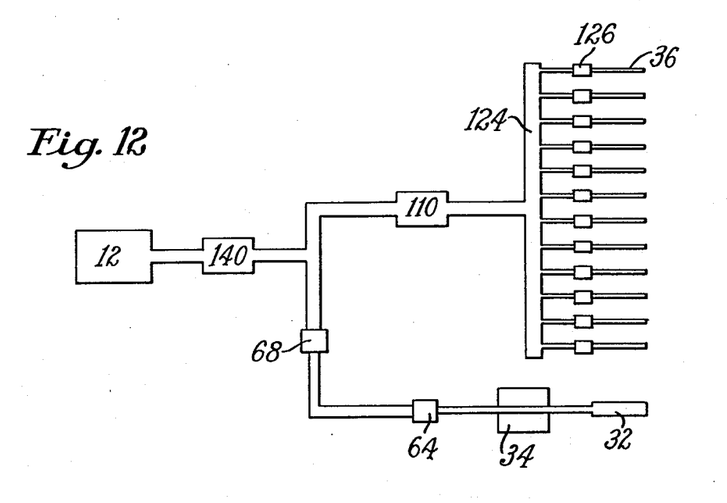
FIG. 12 is a pneumatic diagram.

For vibrating the cup 58 to cause powdered material to be sifted as above explained, there is provided a device which, as best illustrated in FIG. 5, comprises a solenoid 84 which is energized when a microswitch 86 mounted in the hand grip 52 (see FIG. 2) is closed in response to pressure of the trigger 70. The solenoid 84 is supported on a bracket 88 (FIG. 5) secured to the hand grip 52. To the solenoid plunger 90 is attached one end of a spring 92 the other end of which is attached to a pin 94 projecting from the bracket 88. As the solenoid is energized, its plunger 90 is reciprocated and, by engaging a rod 96 projecting from the cup 58 through one of the bushings 46 and the adjacent arm 50 (FIGS. 3 and 5), causes the cup to be vibrated together with the tube 76, as a result of which powdered material in the cup is sifted through the member 78 which forms an integral part of the tube. A stop pin 98 projecting from the bracket 88 limits the extent of the return or inoperative stroke of the plunger 90. The spring 92 is tuned to a resonance frequency of 120 pulses per second to correspond to the impulse rate of the solenoid when supplied with 60 cycle alternating current, so that the cup may be vibrated with maximum force by use of a small vibrator. The solenoid 84 is connected in series to an adjustable autotransformer 100 (FIGS. 1 and 11), provided with a knob 102 which may be set with relation to a dial (not shown) to regulate the voltage of the current supplied to the solenoid, so as to vary the force of the stroke of the plunger 90 and thereby vary the quantity of powder sifted. The tube 76 carries a plurality of spaced agitator members 106 (FIGS. 1 and 10), which, as the tube is vibrated by the solenoid plunger 90, breaks up the compacted mass of powder in the container 34 and thus enable it to descend freely.

The powdered adhesive transported into the tube 32 and discharged therefrom by air circulating through the tube 76 passes through a stream of hot air constantly issuing from the tubes 36 the discharge ends of which are located somewhat in advance of the discharge end of the tube 32. The tubes 36, here shown to be 12 in number, extend forwardly at an angle from a disk or plate 108 (FIGS. 1 and 2) through which also extends a tubular casing 110 integral with a disk 111 which is detachably secured to a hub member 112 formed at the forward end of the gun body, whereby the entire assembly including the heater tubes 36, the casing 110 and the tube 32 may be removed from the body of the gun and replaced by another unit, if necessary, as for example, if the heating elements, referred to below, in the tubes 36 should burn out. Into the casing 110 extends through the hub member 112 a tube 114 which is open at its forward end and closed at its rear end, and which surrounds the powder carrying tube 32, which also extends through the hub member and through the casing 110. The space between the tube 114 and the casing 110 constitutes an outer passageway 116 while that between the said tube and the powder carrying tube 32 constitutes an inner passageway 118. The arrangement is such that the air supplied from the compressor through the hose 74 to the coupling 72 passes through a tube 120 (FIG. 2) extending from the coupling and connected through a fitting 121 to a port 122 provided in one side of the tube 114 and through which the air enters the passageway 118. The forward end of the casing 110 being closed, the air is forced to circulate along the outer passageway 116 toward the rear end of the casing. As this end is also closed, the air is forced to pass through ports 123 on the opposite sides of the casing into a manifold 124 mounted on the casing and from which the air is distributed to each of the tubes 36 through a needle valve 126 associated with each tube and by adjustment of which air flow may be regulated to insure uniform heating of the powder particles by all the tubes. By this arrangement, the air circulating first along the passageway nearest the powder carrying tube 32 tends to maintain the powder therein cool to prevent it from clogging the delivery end of the tube and, as it returns along the passageway close to the heater tubes 36, it becomes warm before entering the manifold to be distributed to these tubes. This pre-heating of the air flowing through the tubes 36 obviates the need of heating them to abnormally high temperatures.

The air flowing through the tubes 36 is heated by electrical elements 128 in the form of resistance wires to which current is supplied through leads 130 from the main switch box. The wires 128 are connected in series by conductors 132 extending through fittings 134 secured to the housings of the needle valves 126. Desirably, the total input wattage of the resistance wires should be correlated with the rate of air flow to provide heat of suitable temperature to effect the complete melting of the adhesive particles deposited on the surface to be coated, it being understood that such temperatures will vary in accordance with the particular characteristics and melting points of the adhesives used. A 2-ohm variable resistor 135 (FIGS. 1 and 11) connected in series with the resistance wires 128 permits regulating the current to prevent overheating of the wires which might cause them to burn out.

It will have been noted that the air compressor motor 16 and the heating elements 128 in the tubes 36 are supplied with electric current from a common source under the control of the switch 22, so that when this switch is turned on, the compressor motor is started to cause air to flow through the tubes 36, and at the same time current is supplied to the elements 128 to heat the air flowing through the tubes. Conversely, when the switch is turned off, the compressor motor is stopped and the supply of current to the heating elements is shut off. However, since the elements are heated to a relatively high temperature, it is important to continue the flow of air through the tubes 36 for a certain length of time, usually about 60 seconds, after the supply of current to the heating elements has been cut off, in order to avoid overheating of the entire unit, and particularly of the powder-carrying tube 32. For this purpose there is included in the power line to the heating elements 128 a connection 136 (FIG. 1) including a switch 138, which is turned on by the operator at the start of a spraying operation and which is turned off shortly before the switch 22 is turned off to shut off current to the compressor motor.

The air supplied to the container 34 and thence to the tube 76 to entrain the powdered material through the tube 32 leaves the compressor at a temperature of approximately 125° F., which is sufficiently high to cause agglomeration of the particles and possible clogging of the outlet end of the tube. It has accordingly been found desirable to lower the air temperature to an acceptable level of approximately 85° F. before it is admitted to the container.

Figure 8:
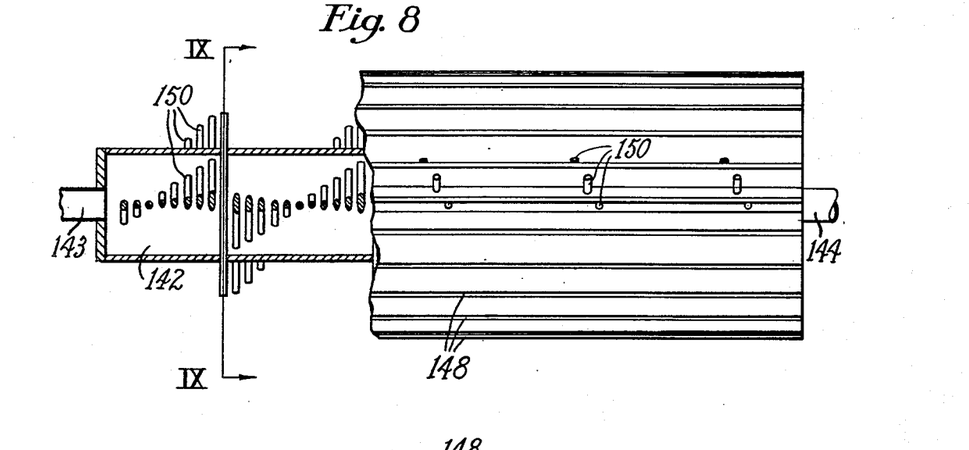
FIG. 8 is a view in side elevation, on an enlarged scale and partly in section, of an air cooling device shown in FIG. 1.
Figure 9:
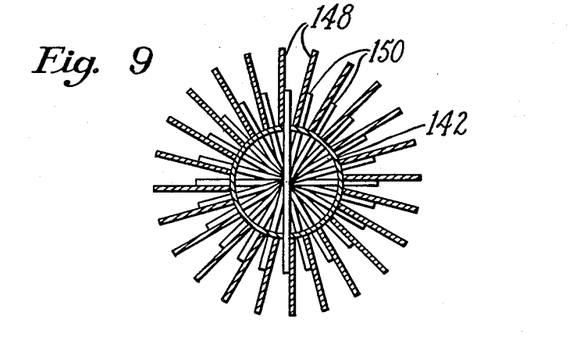
FIG. 9 is a sectional view along the line IX—IX of FIG. 8.

To this end there is provided a cooling device or heat exchanger, identified generally by the reference numeral 140 (FIG. 1) and comprising a tubular casing 142 (FIGS. 1 and 8), preferably of copper, connected at one end by a tube 143 to the outlet end of the compressor 12. At its opposite end the casing is connected to the hose 74 through a tube 144 extending through a bracket 146 attached to the motor 16. Projecting radially from the outer wall of the casing 142 is a plurality of fins 148, to each of which is connected, as by soldering, a plurality of heat conducting rods or pins 150 (FIGS. 8 and 9) which extend through the casing and are disposed spirally along its longitudinal axis, as illustrated in FIG. 8. This spiral arrangement of the pins breaks up the laminar flow of the air through the casing and forces it into more intimate contact with the inner wall of the casing, from which the heat is conducted by the pins 150 to the fins 148 to provide more effective radiation of the heat to the surrounding atmosphere.

The operation of the spraying apparatus provided by the present invention will, it is believed, be apparent from the foregoing description. The apparatus has been devised chiefly for spraying dry powdered heat-reactive adhesive and simultaneously subjecting the particles issuing from the powder conducting tube to the action of heated air supplied by the spray gun, whereby they are first rendered sufficiently tacky to cause them to adhere to the surface against which they are projected, and thereafter heated additionally to melt them completely so as to permit the immediate bonding of a work piece to the coated surface. However, since the spraying of adhesive is controlled independently of the supply of heat and takes place only when the trigger 70 is operated, while the supply of heated air is continuous, it will be evident that the apparatus may be used for performing two-step operations, that is, spraying adhesive onto a surface, allowing it to dry, and applying heat to the deposited particles at some subsequent time to activate the adhesive so as to permit bonding a work piece to the coated surface.

Having thus described our invention, what we claim as new and desire to secure by Letters Patent of the United States is:

1. In an apparatus for spraying and activating dry powdered heat-reactive material, the combination comprising a container for the spray material, a conduit connected to the container through which the spray material is projected, a connection for conducting air from a compressed air source to the container and through said conduit to propel the spray material, a normally closed valve in said connection, means to vibrate the container to cause controlled quantities of spray material to be supplied from the container to said conduit, means for rendering the vibrating means operative and for simultaneously opening said valve to admit air into the container and into the conduit, and electrically heated means providing a heat zone in advance of the delivery end of the conduit through which heat zone the particles of spray material are projected, whereby they are partially activated before they reach the surface to be coated to cause them to adhere thereto and thereafter fully melted to permit the bonding of a work piece to the coated surface.

2. In an apparatus for spraying and activating dry powdered heat-reactive material, the combination comprising a spray gun provided with a hand grip, a container for the spray material, means including a counterweight pivotally connecting the container to the gun hand grip whereby the container maintains its upright position when the gun is tilted, a conduit connected to the container through which the spray material is projected, a connection for conducting air from a compressed air source to the container and through said conduit to propel the spray material, a normally closed valve in said connection, means to vibrate the container to cause controlled quantities of spray material to be supplied from the container to said conduit, manual means for rendering said vibrating means operative and for simultaneously opening said valve to admit air into the container and into the conduit, electrically heated means disposed to provide a stream of heat in advance of the delivery end of the conduit through which the particles of spray material are projected so as to render them partially adherent before they reach the surface to be coated and are thereafter fully melted, and a connection from the compressed air source to the heating means for conducting air therethrough.

3. In an apparatus for spraying and activating dry powdered heat-reactive material, the combination comprising a gun provided with a trigger and a hand grip, a container mounted on the hand grip for a supply of spray material, a cup defining a chamber connected to the container and into which spray material descends by gravity, a first tube extending into the container above the mass of powdered material therein, a second tube extending from the chamber into the container above the mass of powdered material and comprising a sifter member disposed in the chamber, trigger actuated means to vibrate said cup and said second tube to cause controlled quantities of spray material to be sifted from the chamber into said second tube, a conduit connected to said second tube through which the material is projected against a surface to be coated, an air compressor, means including a trigger-actuated normally closed valve and an adjustable needle valve connecting said first tube to the compressor to conduct air under selected pressure through said tube into the container, when said normally closed valve is opened and said vibrating means is rendered operative by actuation of the trigger, to pressurize the container and flow through said second tube to propel the powdered material sifted into it through said conduit, electrically heated means surrounding said conduit, and means connecting said heating means to the compressor to conduct air through the heating means to provide a heat zone in advance of the delivery end of the conduit through which the particles of spray material are projected, whereby they are rendered partially tacky to cause them to adhere to the surface against which they are projected and are subsequently completely melted to permit the bonding of a work piece to the coated surface.

4. In an apparatus for spraying and activating dry heat-reactive powdered material, the combination comprising a container for a supply of spray material, an air compressor, a conduit connected to the compressor and the container and through which the spray material is projected, means to cause controlled quantities of spray material to be supplied intermittently to the conduit, a plurality of electrically heated tubes converging toward each other to provide a concentrated heat zone through which the spray material is projected from the conduit, a manifold to which each of said heated tubes is connected, means connecting the manifold to the air compressor to supply air to each tube, and a needle valve associated with each tube for regulating the air flow through the individual tubes to insure uniform heating of the material by all of said tubes.

5. In an apparatus for spraying and activating powdered heat-reactive material, the combination comprising a container for a supply of spray material, a tubular casing, a conduit extending through said casing and connected to the container for conducting the spray material, means to cause spray material to be supplied intermittently to the conduit, an electrically driven air compressor, a heat exchanger connected to the compressor for cooling the air supplied from the compressor, means connecting the heat exchanger to the container to admit the cooled air into the container and from the container into the conduit to project the spray material, a manifold surrounding said tubular casing, a plurality of electrically heated tubes connected to the manifold, a tube between the casing and the conduit providing an inner passageway surrounding said conduit and an outer passageway surrounded by the casing, means conducting air from the heat exchanger to the manifold for distribution to the heated tubes first through said inner passageway adjacent to the conduit to maintain the material therein cool and then through the outer passageway adjacent the heated tubes to cause the air to be preheated before entering the manifold, and a needle valve associated with each heated tube for regulating the air flow from the manifold to the individual tubes.

6. Apparatus according to claim 5, wherein said heat exchanger comprises a tubular casing, a plurality of radially disposed fins extending longitudinally of the casing, and a plurality of heat conducting rods extending through said casing and connected to each of said fins for increasing the effective heat radiation by the fins.

7. Apparatus according to claim 6, wherein said heat conducting rods are disposed spirally along the longitudinal axis of the casing.

References Cited by the Examiner
UNITED STATES PATENTS

| | | | |
|---|---|---|---|
| 305,713 | 9/84 | Ryan | 165—179 |
| 1,633,306 | 6/27 | Bartling | 118—302 |
| 1,881,610 | 10/32 | Hyde | 165—179 |
| 2,029,450 | 2/36 | Truelsen | 165—179 X |
| 2,687,747 | 8/54 | Bock | 165—179 X |
| 2,805,640 | 9/57 | Davis et al. | 118—302 |

RICHARD D. NEVIUS, *Primary Examiner.*

JOSEPH B. SPENCER, *Examiner.*